United States Patent [19]
Barnes et al.

[11] Patent Number: 5,257,252
[45] Date of Patent: Oct. 26, 1993

[54] ADAPTIVE CONTROL SYSTEM FOR A DISK DRIVE ACTUATOR

[75] Inventors: Ted W. Barnes, Star; Richard B. Wells, Boise, both of Id.

[73] Assignee: Hewlett-Packard Company, Palo Alto, Calif.

[21] Appl. No.: 812,231

[22] Filed: Dec. 18, 1991

[51] Int. Cl.[5] .......................... G11B 7/00; G11B 21/08
[52] U.S. Cl. .............................. 369/44.29; 369/44.35; 369/47; 369/53; 369/59; 369/44.25; 360/78.09; 360/77.06
[58] Field of Search .............. 369/44.11, 44.13, 44.14, 369/44.25, 44.26, 44.27, 44.28, 44.29, 44.32, 44.34, 44.35, 47, 53, 54, 57, 59; 360/75, 77.01, 77.02–77.06, 78.01, 78.06–78.04, 78.09–78.12

[56] References Cited
U.S. PATENT DOCUMENTS 3,881,184  4/1975  Koepcke et al. ............... 360/77.04
4,623,994  11/1986  Nabeshima et al. ............ 369/54
4,745,588  5/1988  Yoshikawa et al. ........... 360/77.06

Primary Examiner—Tommy P. Chin
Assistant Examiner—Khoi Truong

[57] ABSTRACT

A servo loop controls an actuator and read head, the loop being responsive to training signals to cause the actuator to move the read head. An error signal is produced that indicates a less than optimum positioning action by the actuator. A compensating filter alters the servo loop's response to a training signal to cause the actuator to produce a more optimum positioning action, the filter exhibiting an initial value filter characteristic. A processor is responsive to a first training signal to alter the filter's initial characteristic value in a first direction to cause the filter to act upon the first training signal in accordance with the altered characteristic value, and is further responsive to a second training signal to alter the filter's initial characteristic in a second direction to cause said filter to act upon the second training signal in accordance with the altered characteristic value. The processor adjusts the filter characteristic in a direction dependent upon which training signal causes a lower value error signal.

10 Claims, 9 Drawing Sheets

FIG. 12

POLE PARAMETER TRAINING

STORE INITIAL COEFFICIENT VALUE THAT DETERMINED POLE LOCATION

↓

INCREASE POLE LOCATION FREQUENCY COEFFICIENT BY $\delta_p$

↓

APPLY STEP INPUT TRAINING PULSE AND CALCULATE ITAE INDEX VALUE $J_1$ FROM POSITION ERROR SIGNAL AND STORE RESULT

↓

DECREASE POLE LOCATION FREQUENCY COEFFICIENT BY $-\delta_p$

↓

APPLY STEP INPUT TRAINING PULSE AND CALCULATE ITAE INDEX VALUE $J_2$ FROM POSITION ERROR SIGNAL AND STORE RESULT

↓

CALCULATE ITAE INDICES:
$J_1 = J_p(P_i + \delta_p)$
$J_2 = J_p(P_i - \delta_p)$

↓

CALCULATE SLOPE =
$\left[\dfrac{\partial J}{\partial P}\right]_i = \dfrac{J_1 - J_2}{2\delta_p}$

↓

CALCULATE NEW ZERO PARAMETER AND SUBSTITUTE FOR
$P_{i+1} = P_i + \mu \dfrac{1}{\lambda_p}\left[-\dfrac{\partial J}{\partial P}\right]_i$

ADAPTIVE CONTROL SYSTEM FOR A DISK DRIVE ACTUATOR

FIELD OF THE INVENTION

This invention relates to a servo control system for a disk drive head actuator and, more particularly, to an adaptive servo system for controlling the actuator's operation.

BACKGROUND OF THE INVENTION

The problem of controlling read/write head positioning over memory tracks in a disk drive has seen much attention in the prior art. Control systems have been devised to position a selected head over a track even when disturbing forces are present. Bearing and shaft imperfections cause attached disks to wobble when spinning. Such wobble is called run-out, and prior art control systems have been developed to position a head to follow changes in track position even in the presence of such run-out.

Besides run-out, other parameter variations render the position control problem a difficult one to solve. Gain variations, changes in resonance amplitudes and frequencies and other perturbations in a disk actuating control system may significantly change over time. Such parameters also vary from disk drive to disk drive. For instance, the gain of a disk drive control system can range over large margins due to temperature, aging, and unit-to-unit variations. Such changes can cause a head's "settling time" to increase substantially and thus degrade the performance of a disk drive. Further, if system gain falls, disturbance rejection and the ability to follow run-out are both reduced.

The prior art is replete with head/arm actuator control systems In U.S. Pat. No. 4,135,217 to Jacques et al., a servo system provides both coarse and fine positioning. During coarse positioning, stored repeatable error information and offset information is used to generate error signals to control the movement of the head/arm actuator. After coarse positioning, fine positioning information, including offset and stored repeatable error information are used to generate fine positioning error signals to control movement of the head/arm actuator. In U.S. Pat. No. 4,204,234 to Noble, track following is achieved by first storing sensed data signals. Those signals are then compared with subsequent sampled signals, and the differences are used for control purposes.

Alaimo et al. in U.S. Pat. No. 4,630,190, use a reference track to enable calculation of position correction signals from errors which occur as a result of disk wobble. Those correction values are then used to compensate for run-out during read/write operations.

In U.S. Pat. No. 4,412,165 to Case et al., position error signals are derived from a head that is constrained in a correct, on-track position. The position error signals are then stored and employed as a datum against which subsequently read signals are compared to provide further error signals for head/arm position correction.

Sidman, in U.S. Pat. No. 4,536,809, employs a training time in which signals are sensed from a servo track, to enable the generation of a set of misposition error signals. A digital filter adjusts the phase of the digitized misposition signals to compensate for known servo control system and low-pass filter lag. It also adjusts phase lead and gain terms of the fundamental frequency and selected harmonics to enable rejection of high frequency harmonics. Thereafter, the filter generates correction signals from the phase-corrected misposition error signals, with the system iterating the process for one or more disk rotations to obtain further refined misposition error signals. That information is then stored and used with subsequently accessed data, to enable improved track following by the read/write head.

Additional servo position correction and servo track compensation systems can be found in the following IBM Technical Disclosure Bulletins: Griffiths et al., "Self-Calibrating Disk Storage Apparatus", Volume 19, No. 6, November 1976, pp.1991, 1992; Betts, "Null Servo Pattern", Volume 18, No. 8, January 1976, pp. 2656, 2657; Palmer et al., "Packwriter Write Correction System", Volume 13, No. 11, April 1971, page 3505; Matla et al., "Track Servo System Compensating Pattern Defects", Volume 22, No. 8A, January 1980, pp. 3269,3270; Santana, "Generation of Position Correction Signals for All Disk Pack Surfaces", Volume 12, No. 11, April 1970, page 1891; Brock et al., "Recording Position Signals on Record Disks", Volume 22, No. 8A, January 1980; and Brock et. al., "Detecting Erroneous Servo in Record Storage Apparatus", Volume 21, No. 3, August 1978, pp. 932, 933.

Notwithstandinq the many servo read/write head control systems in the prior art, parameter variations that occur due to aging, temperature and environmental disturbances still present problems with respect to head positioning. As indicated above, modest gain variations can cause substantial changes in the settling time of a head and track positioning performance. A real time servo control system for correction of such parameter variations is needed.

Accordingly, it is an object of this invention to provide a control system for a disk drive actuator which is adaptive in response to parameter variations.

It is another object of this invention to provide an adaptive control system for a disk drive actuator that enables rapid and efficient alteration of servo system parameters during real time operation.

SUMMARY OF THE INVENTION

A servo loop is described for controlling an actuator and read head, the servo loop being responsive to training signals to cause the actuator to move the read head. An error signal is produced as a result of the movement of the head to a disk track, the error signal indicating a less than optimum positioning action by the actuator. A compensating filter alters the servo loop's response to a training signal to cause the actuator to produce a more optimum positioning action, the filter exhibiting an initial value filter characteristic. A processor is responsive to a first training signal to alter the filter's initial characteristic value in a first direction to cause the filter to act upon the first training signal in accordance with the altered characteristic value, and is further responsive to a second training signal to alter the filter's initial characteristic in a second direction to cause the filter to act upon the second training signal in accordance with the altered characteristic value. The processor adjusts the filter characteristic's initial value in a direction dependent upon which training signal causes a lower value error signal.

DESCRIPTION OF THE DRAWINGS

FIG. 12 is a flow diagram of a pole parameter training procedure.

DETAILED DESCRIPTION OF THE INVENTION

Figure 1:
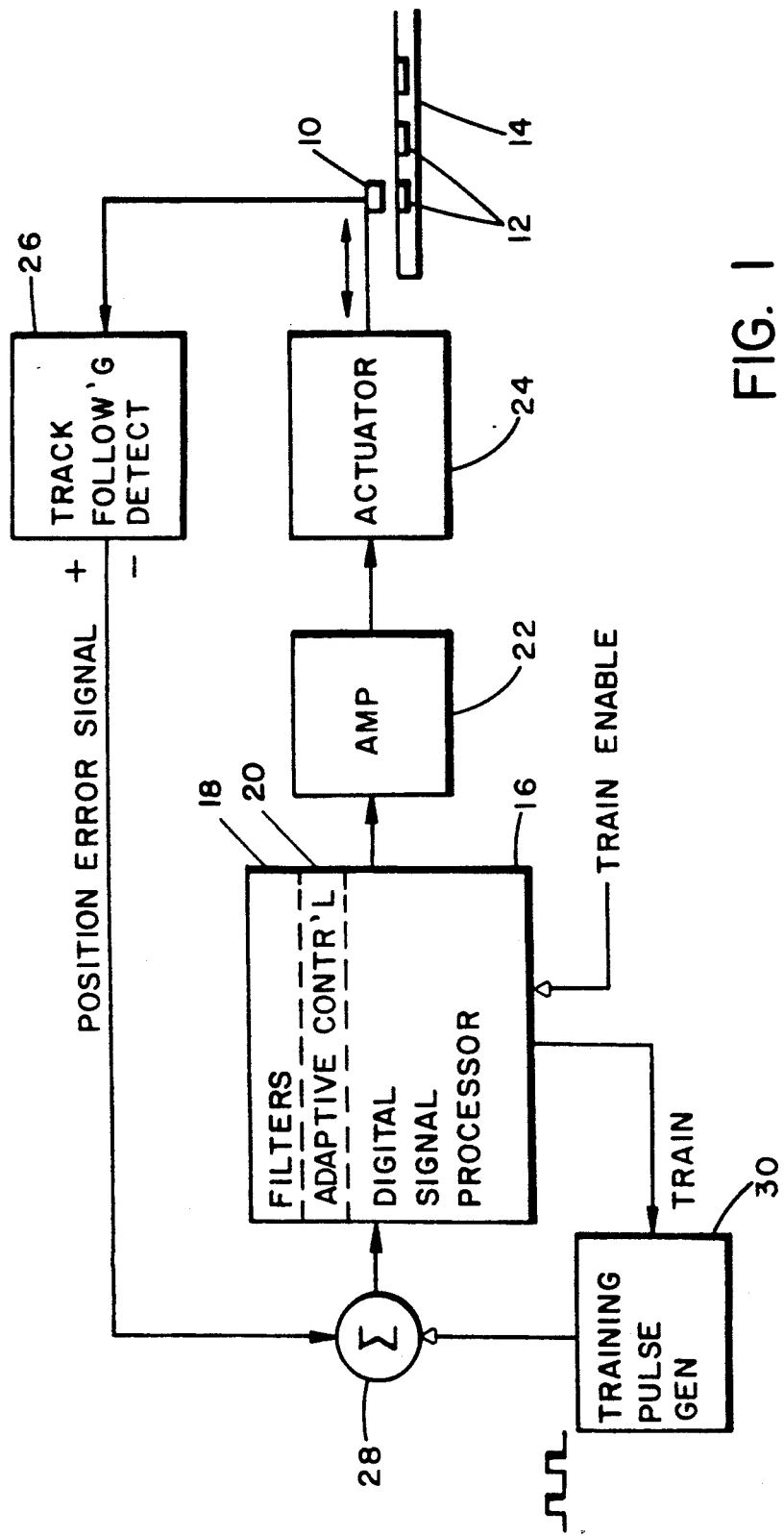
FIG. 1 is a block diagram of an adaptive control system for a disk drive actuator that incorporates the invention hereof.

Referring now to FIG. 1, a disk drive actuator mechanism is shown that positions a read/write head 10 over servo tracks 12 on a disk 14. The disk drive actuator mechanism comprises a digital signal processor 16 that includes both a compensating filter function 18 and an adaptive control function 20 embedded therein. Filter function 18 includes a lead network and an integrating network (lag network). An analog output from digital signal processor 16 is fed through an amplifier 22 and then to an actuator 24 for causing head 10 to move to a servo track 12.

Figure 4:
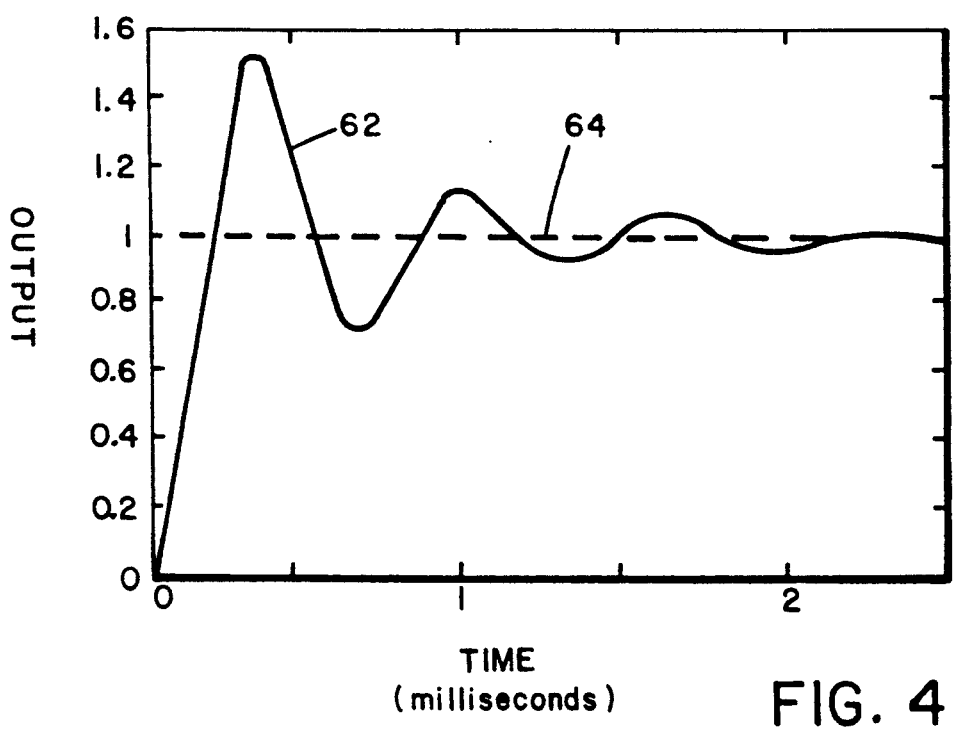
FIG. 4 is a plot of the output response of the actuator mechanism.

In a disk drive, the disks are stacked on a spindle and sampled servo data from each track is not perfectly aligned with the corresponding head. It often occurs that there is a radial shift between the servo tracks due to differential material expansions resulting from temperature variations and material aging. When a head on another disk is selected on the same track, an actuator control system moves the head to the new data track center by employing the sampled servo data from the servo track. In other words, when a head is selected, the control system moves the head over the servo data in order to follow the radial shift. This actuator movement is called a head switch settle. A typical response to a one-half track head switch settle is shown in FIG. 4. In a similar manner, the servo system corrects for mechanical misposition. The correction signal repositions the actuator causing a head switch settle.

Head switch settle is manifested by an output oscillation from head 10 that is fed to a track following detector 26 which produces a voltage whose positive and negative excursions reflect the deviations from track center. The output from track following detector 26 is fed to a summer 28 and then back into digital signal processor 16 for compensation filtering. Within digital signal processor 16, a performance index is derived to provide a measure of the head-settle time of actuator 24. The chosen performance index is the integral over time of the absolute value of the error signal (ITAE). The ITAE index is used by digital signal processor 16 to adaptively adjust compensating filter function 18 so that it reduces the value of the derived ITAE index on subsequent head moves (e.g., moves that result from training signals or head switches).

The ITAE index, to be described below, has been previously employed with other servo systems to provide a measure of transient response thereof. The ITAE index was first described by Graham and Lathrop in "The Synthesis of Optimum Transient Response", Transactions of the American Institute of Electrical Engineers, Vol. 72, (1953), pp.273-288. In brief, an ITAE index provides a single value that indicates a servo system's response when a servo action occurs. The lower the ITAE index value, the better the system's response characteristic. ITAE index values are used in this invention to obtain an indication of the direction of adjustment that is to be applied to the parameters of the servo loop to minimize head-switch settle time. A gradient search routine is employed to find a minimum ITAE index value.

As is known to those skilled in the art, a compensating filter function (sometimes called a "lead" network) is employed in a head/arm actuation mechanism, because the phase shift throughout the system may result in positive rather than negative feedback. Positive feedback will, unless corrected, result in an oscillation of the actuator mechanism and a rendering of the disk drive non-operational. The compensating filter assures that phase shifts are such that a negative value of feedback is assured, notwithstanding system parameter variations.

In order to adaptively adjust compensating filter function 18 (i.e., both lead and lag networks), a training pulse generator 30 is periodically enabled to produce a pair of training pulses that are, in turn, fed to summing node 28 and then into digital signal processor 16. Before a first training pulse is applied, a coefficient value that controls a parameter of filter function 18 is adjusted higher than an initial coefficient value. The training pulse is then applied through the compensating filter and amplifier 22 to actuator 24 and causes head 10 to move off track. The resulting track deviation is converted to an error signal by track following detector 26 and is applied, via summing node 28, into digital signal processor 16. An ITAE value is derived and stored.

Next, a second training pulse is applied, but this time, the filter coefficient is adjusted to a value lower than the initial coefficient value. Again, actuator 24 causes head 10 to move off track, resulting in another settle action. That action is again converted to a feedback error signal via track following detector 26 and is applied to digital signal processor 16. Therein, a new ITAE value is calculated. The two calculated ITAE values are then compared, a slope between them derived, and the initial compensating filter coefficient is modified in a direction opposite to the slope (or gradient) of the two ITAE calculated index values. In this manner, the filter function's coefficient is adjusted in a direction so as to minimize ITAE index values during subsequent head settle actions.

While the above description of the disk drive servo system presumes the presence of a training pulse generator 30, it is to be understood that head actuations that occur during actual operation of the disk drive (e.g., head switch settles) may also be used in lieu of training pulses (or in addition thereto) for adjustment purposes. For the following description, it will be assumed that training pulses are employed.

Figure 2:
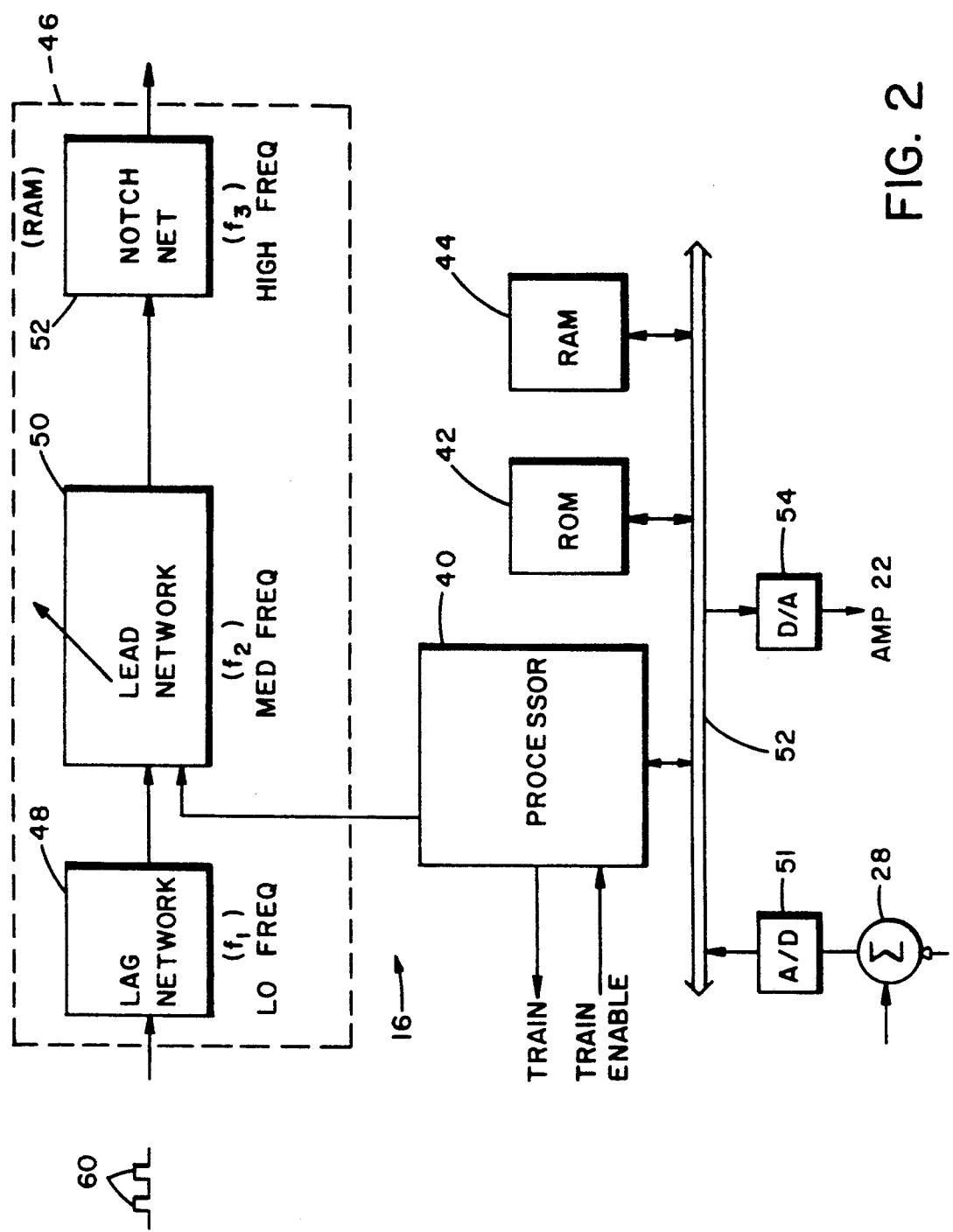
FIG. 2 is a block diagram showing selected components in the digital signal processor shown in FIG. 1.

Referring now to FIG. 2, additional details are shown of digital signal processor 16. A processor 40, in combination with a read only memory (ROM) 42 and random access memory (RAM) 44, provide both filter function 18 and adaptive control function 20. Feedback to processor 40 from summing node 28 is fed via an analog-to-digital converter 51 to bus 52. The output from processor 40 is fed via a digital-to-analog converter 54 to amplifier 22.

The block diagram shown within box 46 illustrates a compensating filter function which is, in effect, digitally implemented by processor 40 in combination with ROM 42 and RAM 44. The three main components of filter function 46 are a lag network 48, lead network 50 and notch network 52. For the purposes of this description, it will be assumed that lead network 50 and a zero of lag network 48 are adaptively adjusted during the operation of the system of FIG. 1. It is to be understood, however, that the invention may be employed to adjust any of a plurality of parameters that control the operation of filter function 46.

Hereafter, the terms "zero" and "pole" will be utilized. A zero is a frequency at which the magnitude of response of the transfer function associated with a filter action goes to low value (preferably zero). A pole is a frequency at which the magnitude of response of the transfer function of a filter action is high or at a maximum. Lag network 48 is an integrator that exhibits a pole at DC and a zero at approximately 100 Hz. Lead network 50 exhibits a zero at approximately 300 Hz and a pole at approximately 900 Hz. Notch network 52 is employed to cancel resonances in actuator mechanism 24 and has poles and zeros ranging from approximately 3 KHz to 6 KHz. As will be seen hereafter, processor 40 adjusts filter function coefficients that, when applied to lead network 50, modify its gain and zero and pole frequencies.

Figure 3:
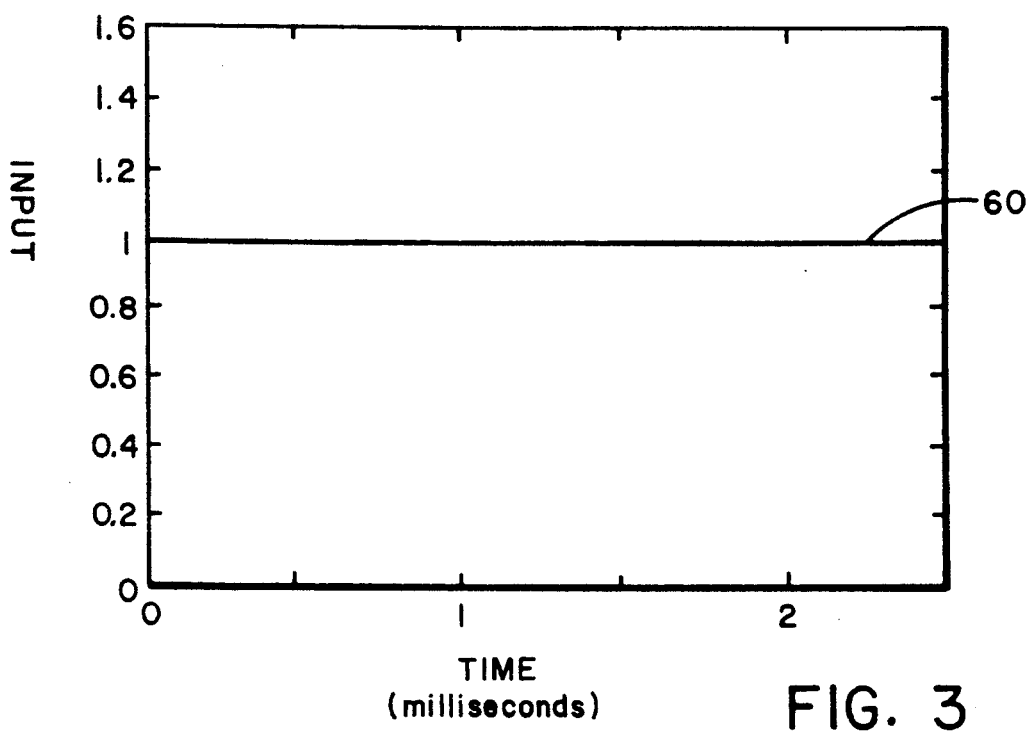
FIG. 3 is a waveform showing a step input training signal.

FIGS. 3-8 enable a better understanding of the ITAE performance index calculated by processor 40 in response to each fed-back position error signal from track following detector 26. FIG. 3 indicates a step function 60 that is applied as a training signal to summer 28 and thence to processor 40 via analog-to-digital converter 50. Processor 40, in response, causes digital-to-analog converter 54 to apply a pulse 60 to amplifier 22 and actuator 24 to cause a head move.

A resulting position signal 62 (FIG. 4) emanates from track following detector 26. Note that position signal 62 evidences a plurality of overshoots (positive and negative) from a desired value 64. Position signal 62 is converted to digital values and is stored in RAM 44. Processor 40 then proceeds to calculate the ITAE index value for signal 62.

Figure 5:
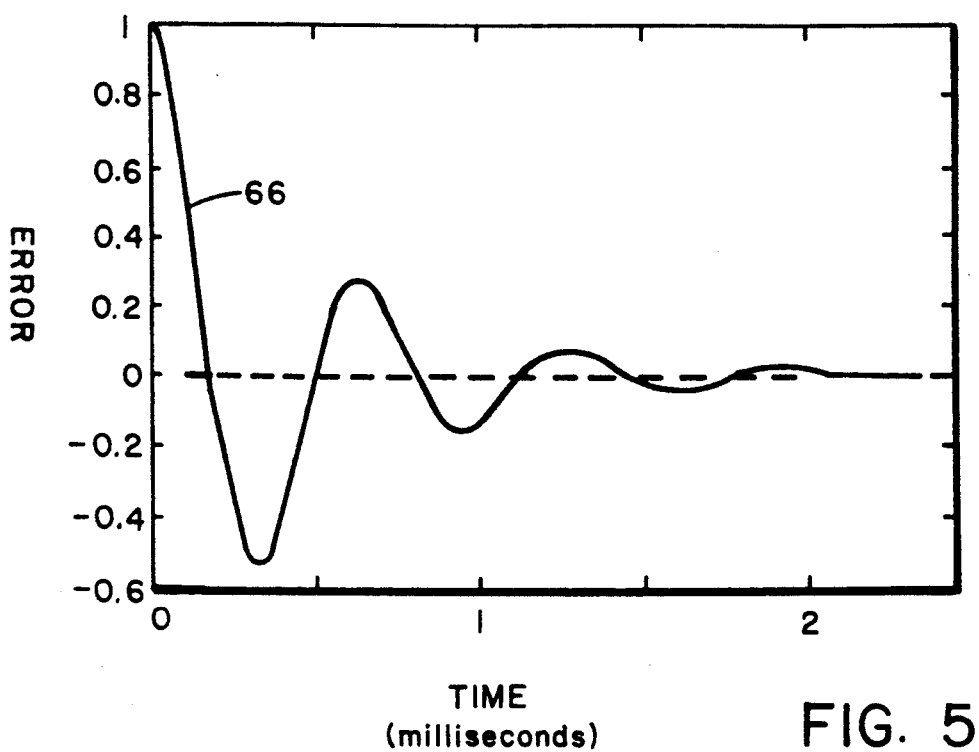
FIG. 5 is a plot of the error signal resulting from the step input of FIG. 3.
Figure 6:
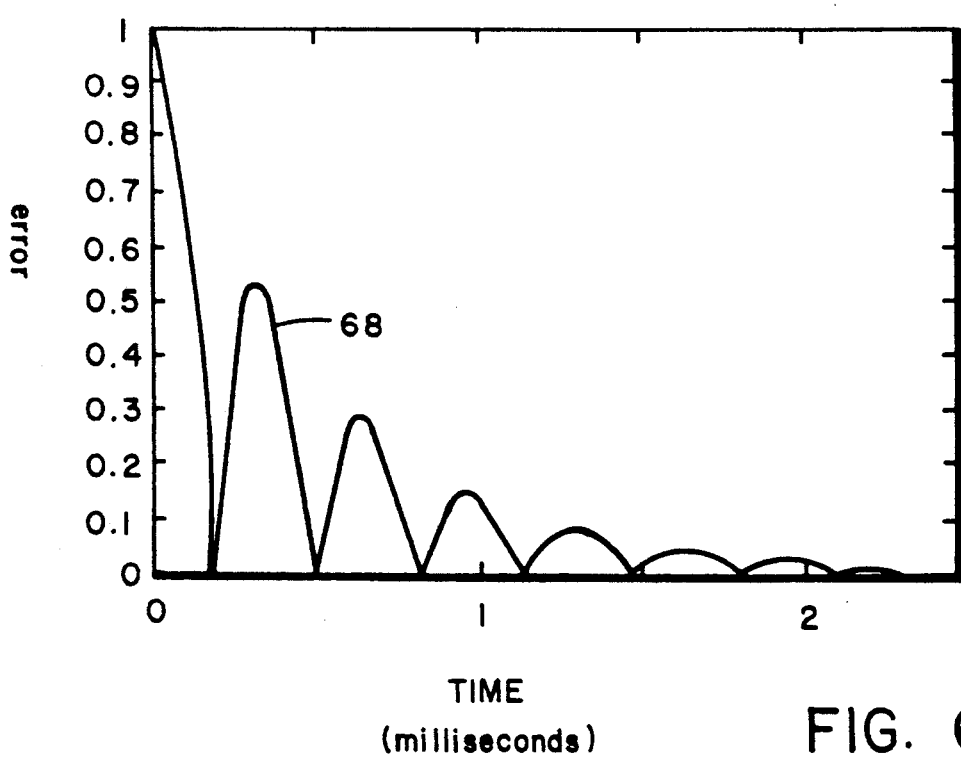
FIG. 6 is a plot of the absolute value of the error signal of FIG. 5.
Figure 7:
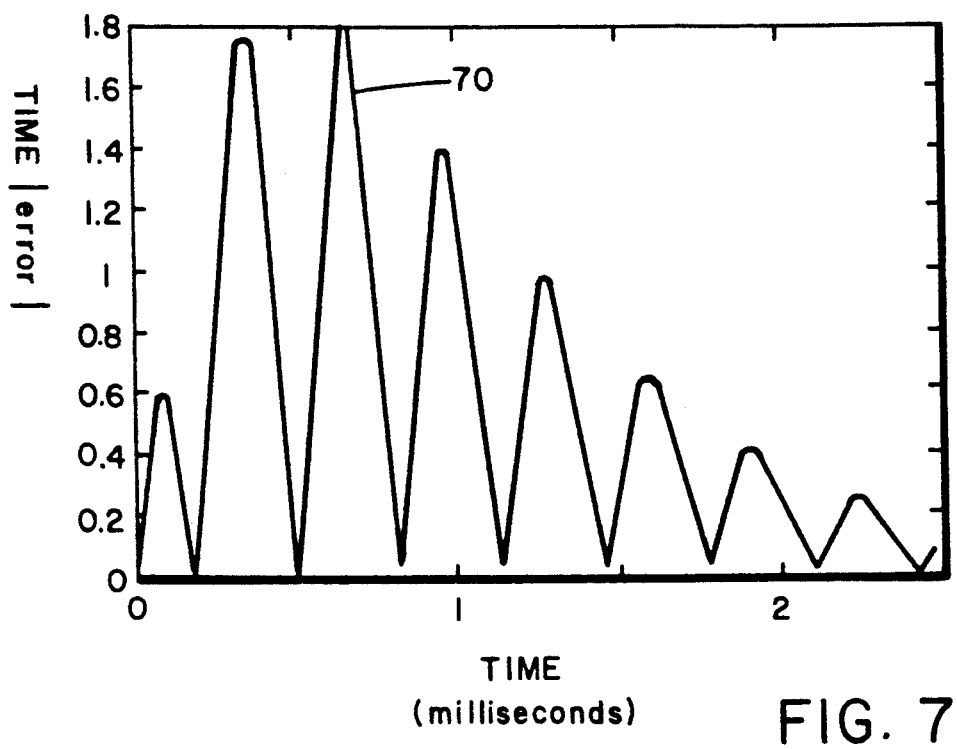
FIG. 7 is a plot of the absolute value of the error signal of FIG. 6 after it has been time weighted.

Initially, processor 40 calculates the value of errors which result from differences between training pulse 60 and position signal 62. The position error signal is shown in FIG. 5 at 66 and is the subtraction of waveform 62 from waveform 60. As can be seen, certain error values are negative and if they are allowed to cancel the positive error signal peaks, an erroneous index will result. For this reason, absolute error values are determined, as shown in FIG. 6, by inverting all negative error values, (as shown by waveform 68). Next, the error values 68 in FIG. 6 are time-weighted. This is accomplished by multiplying each sampled absolute error value by the elapsed time to the sample. This action de-emphasizes the initial error and emphasizes the mid-to-final error deviations that occur in the position error signal. This weighting action is shown by curve 70 in FIG. 7.

Figure 8:
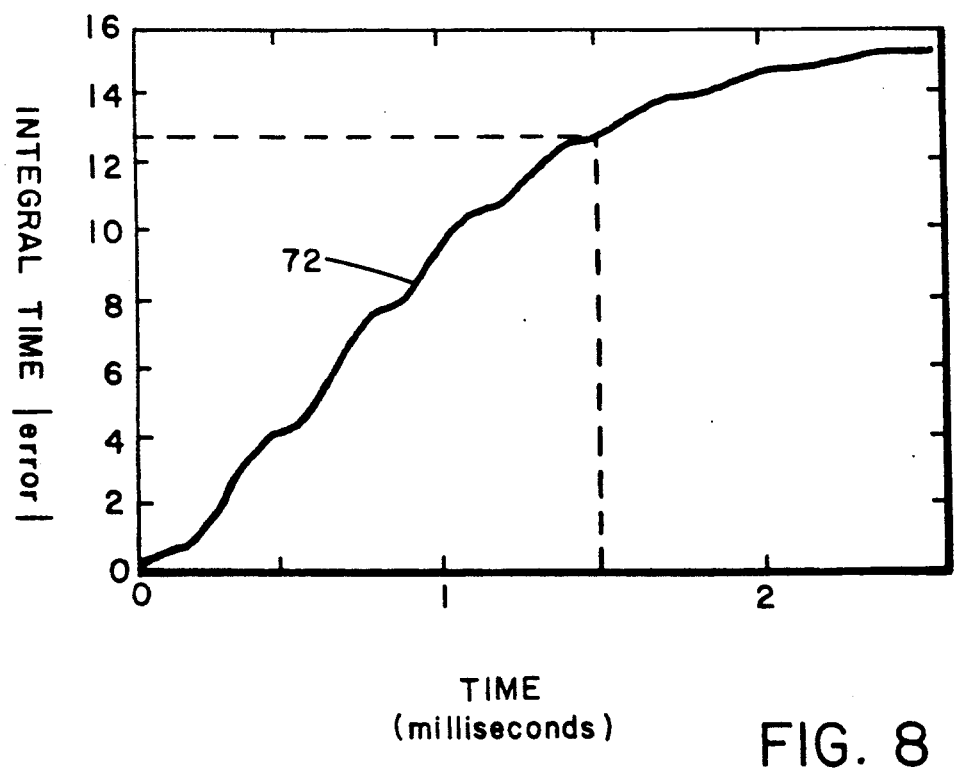
FIG. 8 is the integral over time, of the time-weighted absolute value (ITAE) of the error signal of FIG. 7.

Finally, the time weighted absolute error values of the position error signal are integrated over time to provide waveform 72 shown in FIG. 8. If the integration is taken over 0 to 1.5 milliseconds, then the ITAE value is approximately 13 in response to the application of a training pulse 60.

Figure 9:
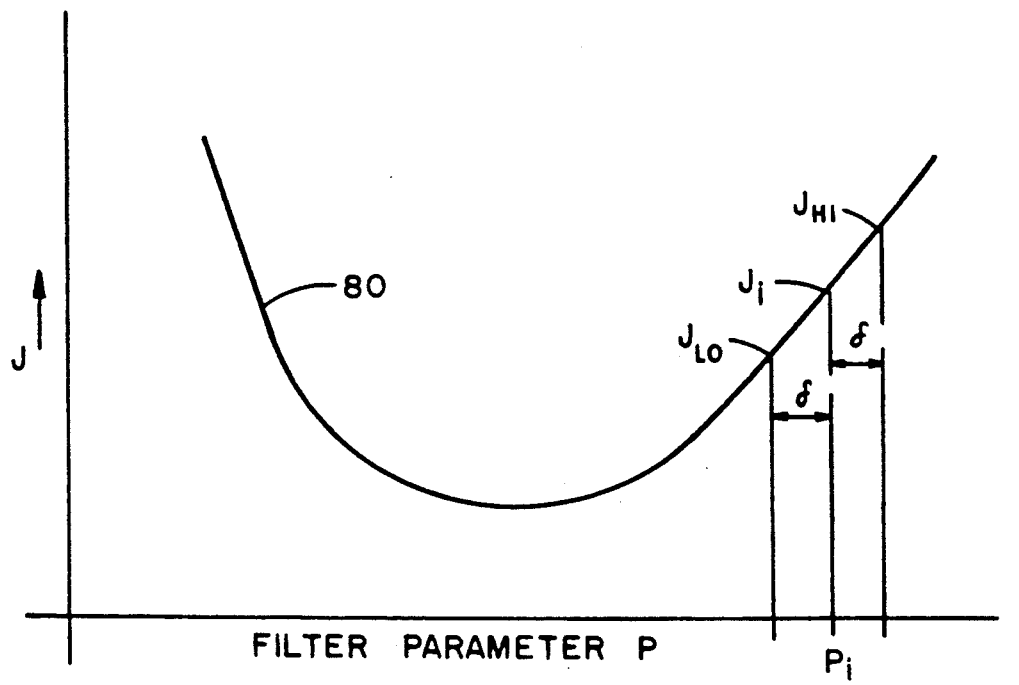
FIG. 9 is a plot of a parameter variation surface that results when performance index is plotted against parameter variation.

The function represented by curve 72 can be represented mathematically as follows:

$$J = \int_0^T et\, dt$$

where:
e = error between desired and actual response (i.e., position error signal when a step training pulse is applied)
t = time
T = final integration time
J = ITAE scalar performance index resulting from a step input It will be recalled that for each pair of training pulses, a compensating filter parameter (i.e., parameter in a lead network) is adjusted, first to a value higher than its initial value, and for the next training pulse, to a value lower than its initial value. The filter parameter is then adjusted in a direction that is opposite to the slope of the surface between the two resultant ITAE indices derived from sensed position error signals. In FIG. 9, a representative surface 80 is shown illustrating the variations of ITAE index J in response to parameter adjustments in an exemplary compensating filter function (lead network).

By setting the filter parameter P at a value $P_i$, an ITAE value $J_i$ results for the initial parameter setting. By modifying filter parameter $P_i$ upwardly by a $\delta$ amount, an ITAE value $J_{hi}$ results. A reduction in the value of $P_i$ by a $\delta$ amount results in an ITAE value $J_{lo}$. The slope between $J_{hi}$ and $J_{lo}$ is approximately equal to the following:

$$\frac{\partial J}{\partial P} \approx \text{Slope} = \frac{J_{hi} - J_{lo}}{2\delta}$$

Once the slope of surface 80 is known between $J_{lo}$ and $J_{hi}$, parameter P can then be adjusted. It is to be adjusted in a direction opposite to the slope of surface 80. Thus, parameter P is adjusted so as to minimize the ITAE index value. The amount of adjustment is as follows:

$$P_{i+1} = P_i + \frac{\mu}{\lambda_p} \cdot \left[ \frac{-\partial J}{\partial P} \right]_i$$

where:
$\mu$ = learning factor; $0 - \mu - 1$
$\lambda_p$ = constant derived from surface 80, defined subsequently
$P_i$ = current parameter value
$P_{i+1}$ = updated parameter value $\mu$ is a learning factor which may be set from a small value (e.g. 0.1) up to a value equal to 1. $\lambda_p$ is a constant derived for a particular parameter surface 80. It is proportional to the rate of change of slope of surface 80 and is derived as a constant, given the approximate shape of surface 80. Thus, if surface 80 has steep sides and a relatively sharp apex, the value of λ is made large so as to cause the application of small adjustment steps of parameter P. If, on the other hand, the sides of surface 80 are shallow, then λ is made smaller to allow larger correction values that move more quickly towards a surface minimum.

Figure 10:
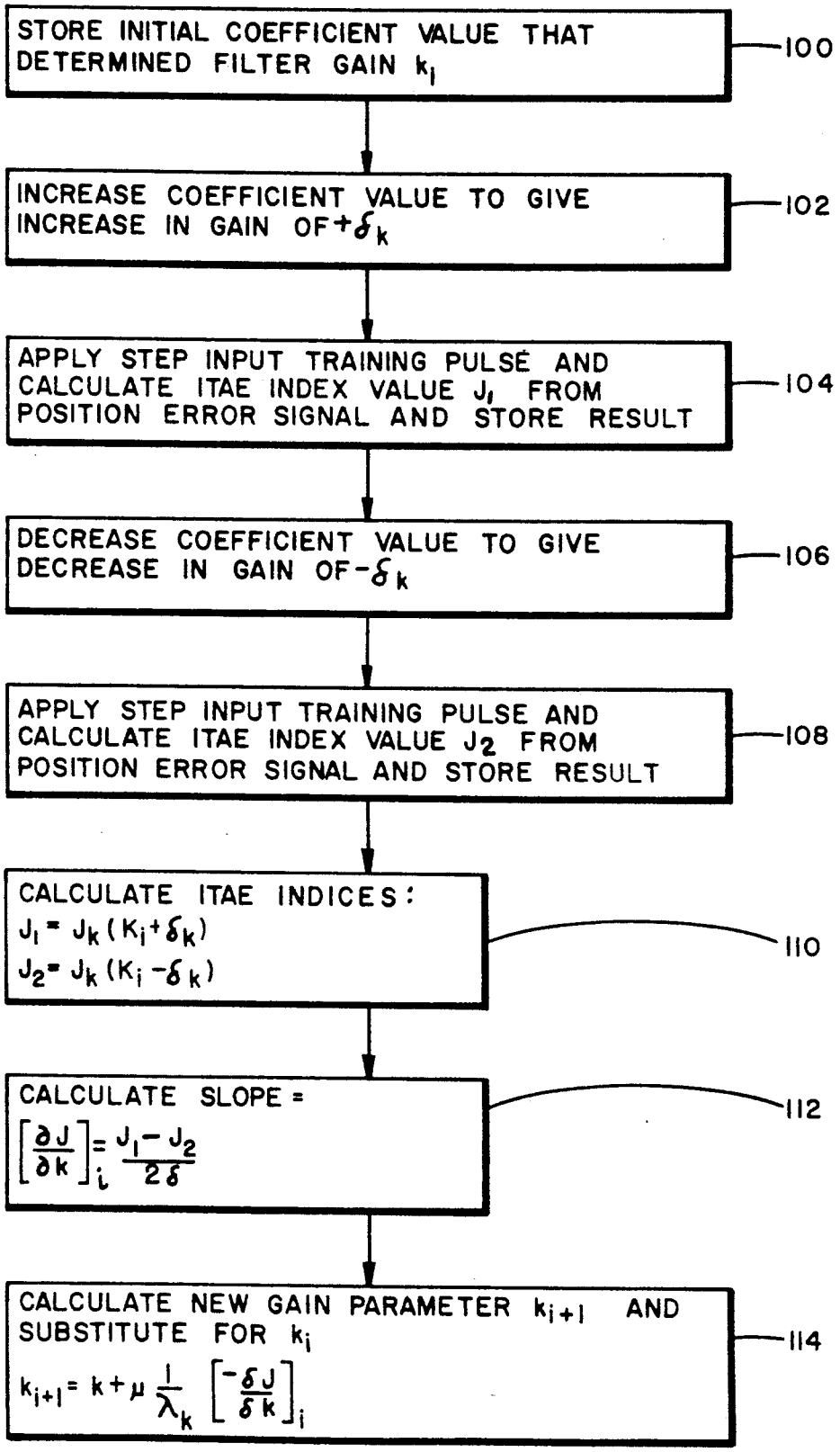
FIG. 10 is a flow diagram illustrating the gain parameter training procedure employed with the system of FIG. 1.

Turning now to the flow charts of FIGS. 10, 11 and 12, the operation of the system of FIG. 1 will be described, first for an adjustment of a gain parameter in compensating filter function 18 (with a lead network topology) and second, for an adjustment of a pole or zero of compensating filter function 18 (using lead compensation). In FIG. 10, the flow diagram illustrates the gain parameter training procedure wherein a pair of training pulses are applied to the servo network by digital signal processor 16. As indicated above, the gain of lead network 50 (see FIG. 2) is adjusted by changing a gain coefficient applied thereto by processor 40. As shown in box 100 in FIG. 10, processor 40 stores the initial current coefficient value that determines the filter's gain $k_i$. Then, processor 40 increases the gain coefficient value to give an increase in gain of $+\delta_k$ (box 102). A step input training pulse is applied to head actuator 24, a position error signal is generated, and a corresponding ITAE index value $J_1$ calculated and stored (box 104).

Next, the gain efficient value is altered to provide a decrease in gain of $-\delta_k$ (box 106). Again, a step input training pulse is applied to head actuator 24 and the calculated ITAE index $J_2$ is stored (box 108). Assuming that the ITAE index $J_k$ has already been calculated for initial filter gain $k_i$, ITAE indices $J_1$ and $J_2$ for both the increase in gain coefficient and decrease in gain coefficient are calculated as follows (box 110):

$$J_1 = J_k(k_i + \delta_k)$$

$$J_2 = J_k(k_i - \delta_k)$$

The slope of the ITAE index surface between ITAE indices $J_1$ and $J_2$ is calculated as follows (box 112):

$$\left[\frac{\partial J}{\partial k}\right]_i = \frac{J_1 - J_2}{2\delta_k}$$

Once the slope is calculated for the ITAE index surface, a new gain parameter $k_{i+1}$ is determined by adjusting the coefficient which gave rise to gain k; in a direction opposite to that of the slope of the ITAE surface. This adjustment is shown in box 114 and can be expressed as follows:

$$k_{i+1} = k_i + \frac{\mu}{\lambda_k} \cdot \left[\frac{-\partial J}{\partial k}\right]_i$$

It will be recalled from the above, that $\lambda_k$ is a derived constant for the ITAE surface (with respect to gain) that is derived from the rate of change of slope.

The procedure is repeated until a minimum ITAE index value is determined.

Figure 11:
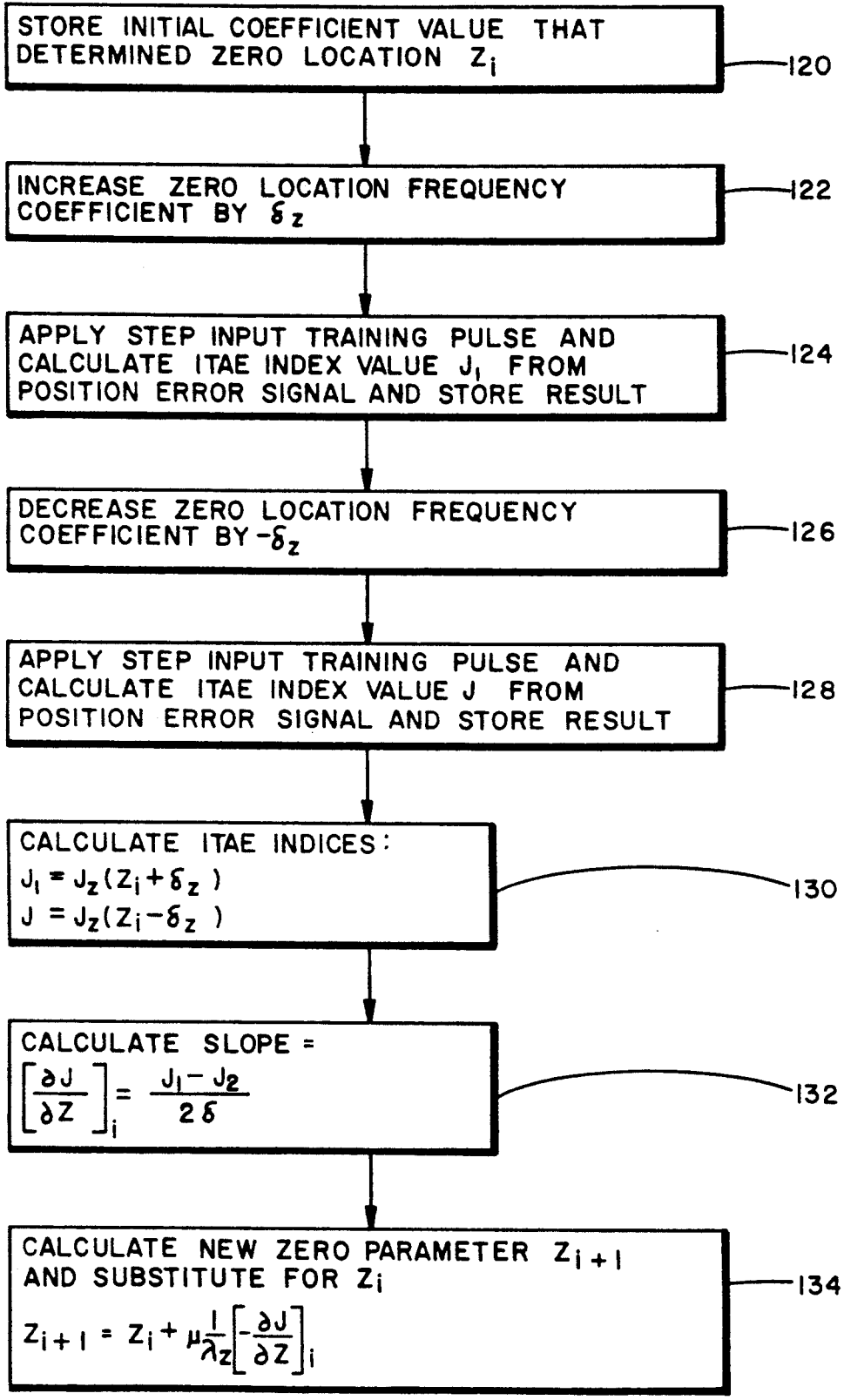
FIG. 11 is a flow diagram of a zero parameter training procedure employed with the system of FIG. 1.

Turning now to FIG. 11, the zero parameter training procedure is illustrated. It is to be understood that pole parameter training is essentially identical. As with gain parameter training, the procedure causes an initial coefficient value that determines a zero location $z_1$ to be stored for later access (box 120).

The zero location frequency is then increased by incrementing the zero frequency-determining coefficient by an amount $+\delta_z$ (box 122). The training procedure shown in box 124 is then carried out. The zero location frequency is then decreased by an amount $-\delta_z$ and a training action again occurs (boxes 126, 128). The ITAE indices corresponding to the two newly derived zero locations are calculated, as shown in box 130, and the slope therebetween is calculated as shown in box 132. Finally, a new zero parameter $z_{i+1}$ is calculated and substituted for $z_i$, through the use of the function shown in box 134. This process is repeated until a minimum ITAE index value results.

FIG. 12 indicates the pole parameter training procedure and is identical to FIG. 11 except that pole values are perturbed rather than zero values.

From the above, it can be understood that the filter function shown in FIG. 1 can be trained in a very precise manner to reduce the position error signal resulting from a movement of head actuator mechanism 24. The use of the ITAE index provides a single performance indicator which can be modified in a precise manner to achieve an optimum compensating filter adjustment. Furthermore, each parameter of the filter function can be individually or jointly adjusted so as to enable optimum filtering action.

It should be understood that the foregoing description is only illustrative of the invention. Various alternatives and modifications can be devised by those skilled in the art without departing from the invention. For instance, while the ITAE index has been described herein, other indices can be employed, e.g. mean square error, integral absolute error criterion and others (See Ogata, Modern Control Engineering, (1970) pages 296-301. Accordingly, the present invention is intended to embrace all such alternatives, modifications and variances which fall within the scope of the appended claims.

We claim:

1. In a disk drive, a servo loop for controlling an actuator and read head, the combination comprising:
   means for applying a training signal to said servo loop, said actuator responding to a training signal to move said read head;
   track error means for producing an error signal upon a movement of said head to a track on a disk, said error signal indicating a positioning error of said actuator and read head;
   controllable filter means exhibiting an initial filter parameter value; and
   processor means responsive to a first training signal to alter said filter means' initial filter parameter value in a first sense from said initial filter parameter value, to cause said controllable filter means to modify said first training signal in accordance with an altered filter parameter value, and further responsive to a second training signal to alter said controllable filter means' initial filter parameter value in a second sense opposite to said first sense to cause said controllable filter means to modify said second training signal in accordance with said altered initial filter parameter value, said track error means producing first and second error signals in response to said first and second training signals, said processor means responsive to said first and second error signals to adjust said controllable filter means' initial filter parameter value int he first sense if said first training signal causes said track error means to produce a lower error signal than an error signal produced as a result of said second training signal, or in the second sense if said first training signal causes said track error means to produce a larger error signal than an error signal produced as a result of said second training signal.

2. The disk drive as recited in claim 1, wherein said controllable filter means is configured by said processor means, said processor means including means for altering said controllable filter means by adjusting coefficients that control and controllable filter means' action.

3. The disk drive as recited in claim 2, wherein said processor means includes calculation means for determining which said error signal is of lower value by deriving, for each said error signal generated in response to a training signal, an integral over time of the absolute value of the error signal, determining a slope between plural derived ITAE's in relation to altered filter coefficients, and further adjusting said filter means by modifying a said filter coefficient in a direction opposite to said determined slope.

4. The disk drive as recited in claim 3, wherein said calculation means modifies said filter coefficients by a learning factor.

5. The disk drive as recited in claim 4 wherein said calculation means reduces said learning factor by a constant whose value is derived from a rate of change of said slope between said plural derived ITAE values.

6. The disk drive as recited in claim 5 wherein said training signals are equal valued step functions.

7. The disk drive as recited in claim 3 wherein said filter characteristic is a coefficient that determines a gain value.

8. The disk drive as recited in claim 3 wherein said filter characteristic is a coefficient that determines a zero frequency position.

9. The disk drive as recited in claim 3 wherein said filter characteristic is a coefficient that determines a pole frequency position.

10. The disk drive as recited in claim 1, wherein said processor means includes further means for causing said means for applying to apply a plurality of training signals to said servo loop until said error signal value is determined to be in a minimum range.

* * * * *